US008135536B2

(12) United States Patent  (10) Patent No.: US 8,135,536 B2
Matsunaga et al.  (45) Date of Patent: Mar. 13, 2012

(54) LEAD ROUTE GUIDANCE SYSTEM, PORTABLE ROUTE LEAD GUIDANCE DEVICE, AND PROGRAM

(75) Inventors: Takayuki Matsunaga, Tokyo (JP); Hiroshi Sakamoto, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 1013 days.

(21) Appl. No.: 11/793,825

(22) PCT Filed: Dec. 24, 2004

(86) PCT No.: PCT/JP2004/019359
§ 371 (c)(1),
(2), (4) Date: Jun. 22, 2007

(87) PCT Pub. No.: WO2006/067855
PCT Pub. Date: Jun. 29, 2006

(65) Prior Publication Data
US 2008/0109164 A1  May 8, 2008

(51) Int. Cl.
*G01C 21/00* (2006.01)
*G06F 17/30* (2006.01)
*G06T 11/20* (2006.01)
(52) U.S. Cl. ............ 701/201; 707/803; 345/441
(58) Field of Classification Search .......... 701/26, 701/200–226; 342/46, 357.21, 357.22, 357.39, 342/357.59, 357.71; 715/737, 738, 850, 715/851, 854, FOR. 207, FOR. 178, 972, 715/756, 716–723, 727, 728; 340/539.25, 340/988–996, 995.13, 995.27; 725/10, 53, 725/105–118; 455/454, 456.1
See application file for complete search history.

(56) References Cited

U.S. PATENT DOCUMENTS
5,206,811 A * 4/1993 Itoh et al. ............... 701/211
(Continued)

FOREIGN PATENT DOCUMENTS
JP  410281785  * 10/1998
(Continued)

OTHER PUBLICATIONS

Notification of Transmittal of Translation of the International Preliminary Report on Patentability (Form PCT/IB/338) of International Application No. PCT/JP2004/019359 mailed Dec. 27, 2007 with Form PCT/IPEA/409.

(Continued)

*Primary Examiner* — James Trammell
*Assistant Examiner* — Muhammad Shafi
(74) *Attorney, Agent, or Firm* — Westerman, Hattori, Daniels & Adrian, LLP

(57) ABSTRACT

A lead route guidance system capable of displaying route guidance not causing the user to be confused by the difference between the line of vision and the route guidance image, a portable route lead guidance device, and program are provided. The lead route guidance system comprises route storage means storing a route from a start point to a destination, route guidance image creating means for creating a route guidance image (24) containing a route image (22) for specifying the route and a lead image (23) for leading the route by displaying a lead position on the route ahead of the current position of the user, a display screen (11) for displaying thereon the route guidance image (24), walk detecting means for detecting walk of the user, and lead position updating means for updating the lead position depending on the walk of the user when the walk of the user is detected.

5 Claims, 12 Drawing Sheets

U.S. PATENT DOCUMENTS

| | | | |
|---|---|---|---|
| 6,546,336 B1 * | 4/2003 | Matsuoka et al. | 701/213 |
| 7,092,819 B2 * | 8/2006 | Odachi et al. | 701/211 |
| 7,658,695 B1 * | 2/2010 | Amsbury et al. | 482/8 |
| 2003/0236614 A1 * | 12/2003 | Yamakita et al. | 701/207 |
| 2004/0207719 A1 * | 10/2004 | Tervo et al. | 348/14.02 |
| 2005/0049786 A1 * | 3/2005 | Odachi et al. | 701/211 |

FOREIGN PATENT DOCUMENTS

| | | |
|---|---|---|
| JP | 2000-097722 A | 4/2000 |
| JP | 2001-141495 A | 5/2001 |
| JP | 2002-109679 A | 4/2002 |
| JP | 2002-357449 A | 12/2002 |
| JP | 2003-254764 A | 9/2003 |
| JP | 2003-344093 A | 12/2003 |
| JP | 2004-020345 A | 1/2004 |
| JP | 2005-069800 A | 3/2005 |

OTHER PUBLICATIONS

International Search Report of PCT/JP2004/019359, date of mailing Apr. 12, 2005.

* cited by examiner

Starting Point
- ⊙ GPS
- ○ Phone
- ○ Address

} STARTING POINT INPUT FIELD

Destination

] DESTINATION INPUT FIELD

Date and Time

☐/☐/☐
☐:☐

⊙ Departure ○ Arrival

} DEPARTURE/ ARRIVAL DATE AND TIME INPUT FIELDS

Number of Search Results
⊙ 1 ○ 2 ○ 3

] SEARCH RESULT NUMBER INPUT FIELD

Means of Transportation
- ⊙ Public Transportation
- ○ Walking    +Walking
- ○ By Car

} MEANS OF TRANSPORTATION INPUT FIELD

[Start Search] — "START SEARCH" ICON

Fig. 3

LEAD ROUTE GUIDANCE SYSTEM, PORTABLE ROUTE LEAD GUIDANCE DEVICE, AND PROGRAM

TECHNICAL FIELD

The present invention relates to a lead route guidance system that uses such a portable route lead guidance device that is capable of providing route guidance, as a mobile telephone, a personal digital assistant (PDA), and a personal notebook computer. More particularly, the invention relates to a lead route guidance system, a portable route lead guidance device, and a program that are capable of providing lead route guidance even when the position of a portable terminal is indeterminable.

RELATED ART

In recent years there has been remarkable development in mobile telephones and other portable terminals. Whereas previously mobile telephones were simply terminal devices for telephone calls, they have come to be used as general portable terminal devices that perform data communication by connecting to various servers via networks such as the Internet, and the popularity of portable terminals has become extremely high. In particular, the trend is such that in what is termed the third generation of mobile telephones, all models will carry positioning units—such as global positioning system (GPS) receivers that determine position by receiving signals from GPS satellites—now carried by only some mobile telephones.

The positioning technology for the current position of a portable terminal utilizing a built-in GPS receiver has already been in use for car navigation systems and communication navigation systems, and the positioning accuracy has been improved. However, since the reception of signals from GPS satellites is an essential prerequisite, it is not so suitable for the use in underground malls as well as inside the buildings under the present situation.

As for the technology to identify the position of a portable terminal without relying on GPS, for example, Patent Document 1 (JP-A-2002-109679) discloses such a positional information providing system. This is a positional information providing system that provides information to a traveler, constituting a traveler's path within a specific area as a passage network by using a physical means set on roads, and providing passage network nodes and terminal points with an information communication means that allows a radio communication access. Further, in this system, each of the information communication means of the nodes and terminal points of the passage network and of the traveler has a unique independent number. Independent signals corresponding to the independent numbers are transmitted to a central processing unit, and processed appropriately to create a positional information database of the traveler. Then, this system provides the traveler's positional information to the traveler or to a third person via the Internet, utilizing the positional information database.

Patent Document 2 (JP-A-2003-344093) discloses a route guidance system that provides route guidance to a portable terminal at places where the reception of GPS signals is impossible such as underground malls. Thus, this route guidance system is to enable an operator as a pedestrian to recognize the current position properly and to understand a route to his/her destination easily, even at places where the recognition of the current position is difficult such as underground malls. This route guidance system is constituted by a route searching section for searching an underground route based on map data, a route guidance data creating section for creating guidance data to guide through the searched underground route based on the map data and guidance signboard data, and a transmission data creating section for creating transmission data for displaying character strings of guidance signboards on a display screen based on the created guidance data.

Further, Patent Document 3 (JP-A 2004-20345) also discloses a guidance device that obtains data from a guidance signboard.
[Patent Document 1] JP-A-2002-109679
[Patent Document 2] JP-A-2003-344093
[Patent Document 3] JP-A-2004-20345

DISCLOSURE OF THE INVENTION

Problems to be Solved

The related-art methods, however, require the provision of some sort of device on paths in order to obtain the current position from a communication means such as a terminal point or to obtain the current position likewise from a signboard. It is feasible to provide such devices within a limited area, but it is impractical to provide such devices in all paths accessible in terms of cost and management.

Further, in general, when a user walks, he/she walks looking ahead towards the direction of travel and seldom walks looking at both sides of the path to confirm. However, as a route guidance image on an information display screen of a portable terminal shows the current position, what are shown in the route guidance image are such landmarks as buildings and signboards on both sides of the user, rather than the landmarks in front of the user following his/her line of vision. This causes the user to be confused and to take a wrong way by turning at an intersection behind a landmark.

In view of the above mentioned problems, the present invention provides a lead route guidance system, a portable route lead guidance device, and a program that provide a route guidance display that ensures the user not to cause any confusion by the difference between the user's line of vision and the route guidance image, as to solve a first technical problem.

The present invention also provides a lead route guidance system, a portable route lead guidance device, and a program that enable guidance without making mistakes on a route even in the situation where obtaining positional information by GPS is impossible, as to solve a second technical problem.

Means to Solve the Problems

The present invention to solve the above mentioned problems will now be described. However, the elements of the present invention have the marks of the elements in the preferred embodiment in parentheses in addition, for easier correspondence to the elements in the preferred embodiment described later on. The reason to describe the present invention by corresponding to the marks in the preferred embodiment is merely to make the understanding of the present invention easier, but not intended to limit the scope of the present invention only to the specific embodiment.
(The Present Invention)
(First Invention)

To address the above-mentioned technical problems, a route lead guidance system (S) according to a first invention includes: route storage means (e.g. route guidance data storage means KC15B) that stores a route from a starting point to a destination; route guidance image creating means (KC18)

that creates a route guidance image (24) including a route image (22) specifying the route, and a lead image (23) showing a lead position on the route ahead of a user's current position to lead the route; a display screen (11) that shows the route guidance image (24); walk detecting means (KC4) that detects the user's walking; lead position update means (KC16C) that updates the lead position in accordance with the user's walking as the user's walking is detected; the route storage means (route guidance data storage means KC15B) storing a guidance point located on the route at which guidance is provided to the user; guidance point arrival judging means (KC17C) that judges whether the lead position arrives at the guidance point on the route; and the lead position update means (KC16C) suspending updating of the lead position as the lead position arrives at the guidance point.

(Operation of First Invention)

In the thus structured route lead guidance system (S) according to the first invention, when the walk detecting means (KC4) detects the user's walking, the lead position update means (KC16C) updates the lead position in accordance with the user's walking. The route guidance image creating means (KC18) creates the route guidance image (24) including the route image (22) specifying the route and the lead image (23) showing a lead position on the route ahead of the user's current position to lead the route. The display screen (11) shows the route guidance image (24).

The route lead guidance system (S) according to the first invention uses the lead image (23) to provide guidance towards the direction of the user's travel. Accordingly, the user can confirm buildings and signboards in front of the user following his/her line of vision with the route guidance image (24). This system makes it less likely for the user to cause any confusion by the difference between the user's line of vision and the route guidance image (24).

The route lead guidance system (S) according to the first invention detects the user's walking to update the lead position. Accordingly, the system can provide guidance without error under circumstances where positioning based on GPS is impossible. Furthermore, the lead position is updated in conjunction with the detection of walking, making it less likely that the lead position moves too much.

In addition, updating of the lead position is suspended at the guidance point, whereby it is less likely that the guidance point moves too much apart from the current position of the user.

(First Aspect of First Invention)

In the first aspect of the first invention, the route lead guidance system (S) according to the first invention includes: lead image setting means (KC18B) that sets an updated lead image (23a) that specifies that the lead position is being updated as the lead image (23) when the lead position is being updated and sets a suspended lead image (23b) that specifies that updating of the lead position is suspended as the lead image (23) when updating of the lead position is suspended.

(Operation of First Aspect of First Invention)

In the thus structured route lead guidance system (S) according to the first aspect of the first invention, the route storage means (e.g. the route guidance data storage means KC15B) stores a guidance point located on the route at which guidance is provided to the user. The guidance point arrival judging means (KC17C) judges whether the lead position arrives at the guidance point on the route. The lead position update means (KC16C) suspends updating of the lead position as the lead position arrives at the guidance point.

Accordingly, since updating of the lead position is suspended at the guidance point, the route lead guidance system (S) according to the first aspect of the first invention makes it less likely that the guidance point moves too much apart from the current position of the user.

(Second Aspect of First Invention)

In the second aspect of the first invention, the route lead guidance system (S) according to the first invention or the first aspect of the first invention includes: the route guidance image creating means (KC18) that creates a route guidance image (24) including a lead position update instruction image (29) that enables the user to instruct executing and suspending updating of the lead position; and the lead position update means (KC16C) that executes and suspends updating of the lead position in accordance with an entry to the lead position update instruction image (29).

(Operation of Second Aspect of First Invention)

In the thus structured route lead guidance system (S) according to the second aspect of the first invention, the route guidance image creating means (KC18) creates the route guidance image (24) including the lead position update instruction image (29) that enables the user to instruct executing and suspending updating of the lead position. The lead position update means (KC16C) executes and suspends updating of the lead position in accordance with an entry to the lead position update instruction image (29). Accordingly, the route lead guidance system (S) according to the second aspect of the first invention enables instruction of execution and suspension of updating of the lead position in accordance with the user's entry.

(Third Aspect of First Invention)

In the third aspect of the first invention, the route lead guidance system (S) according to the second aspect of the first invention includes: update instruction image setting means (e.g. a toggle key image setting means KC18A) that sets an update suspension instruction image (29a) that instructs suspension of updating of the lead position as the lead position update instruction image (29) when the lead position is being updated and sets an update instruction image (29b) that instructs execution of updating of the lead position as the lead position update instruction image (29) when updating of the lead position is suspended.

(Operation of Third Aspect of First Invention)

In the thus structured route lead guidance system (S) according to the third aspect of the first invention, the update instruction image setting means (e.g. toggle key image setting means KC18A) sets the update suspension instruction image (29a) that instructs suspension of updating of the lead position as the lead position update instruction image (29) when the lead position is being updated. Also, the update instruction image setting means (KC18B) sets the update instruction image (29b) that instructs execution of updating of the lead position as the lead position update instruction image (29) when updating of the lead position is suspended.

Accordingly, the route lead guidance system (S) according to the third aspect of the first invention instructs suspension of updating without error, providing no undesired instruction to execute updating during execution of updating of the lead position. In the same manner, the system instructs execution (resumption) of updating without error, providing no undesired instruction to suspend updating during suspension of updating.

The route lead guidance system (S) according to any of the first to third aspects of the first invention may include: an acceleration sensor (SN1) that detects acceleration; spectral analysis means (KC4C) that performs spectrum analysis based on an output signal of the acceleration sensor (SN1); walk detecting means (KC4) that detects the user's walking as a spectrum that is characteristic to walking is detected as a result of the spectrum analysis made by the spectral analysis means (KC4C); lead position moving distance calculating means (KC16C1) that calculates a moving distance of the lead position based a period for the spectrum analysis and a lead speed that is a moving speed of the lead position; and the lead position update means (KC16C) that executes updating of the lead position based on the moving distance of the lead position.

In the thus structured route lead guidance system (S), the acceleration sensor (SN1) detects acceleration that acts on the acceleration sensor (SN1). The spectral analysis means (KC4C) performs spectrum analysis based on an output signal of the acceleration sensor (SN1). The walk detecting means (KC4) detects the user's walking as a spectrum that is characteristic to walking is detected as a result of the spectrum analysis made by the spectral analysis means (KC4C). The lead position moving distance calculating means (KC16C1) calculates the moving distance of the lead position based a period for the spectrum analysis and a lead speed that is a moving speed of the lead position. The lead position update means (KC16C) executes updating of the lead position based on the moving distance of the lead position. In this case, walking is detected based on an output signal of the acceleration sensor (SN1), thereby detecting the moving distance of the lead position. Accordingly, the lead position can be updated under circumstances where receiving GPS signals is impossible.

Furthermore, in the route lead guidance system (S) according to any of the first to third aspects of the first invention, the lead speed is set faster than the user's moving speed. In this case, since the lead speed is set faster than the user's moving speed, the lead position is ahead (in front) of the user's current position on the route.

(Fourth Aspect of First Invention)

In the fourth aspect of the first invention, the route lead guidance system (S) according to the third aspect of the first invention includes: update instruction image setting means (e.g. a toggle key image setting means KC18A) that sets an update suspension instruction image (29a) that instructs suspension of updating of the lead position as the lead position update instruction image (29) when the lead position is being updated and sets an update instruction image (29b) that instructs execution of updating of the lead position as the lead position update instruction image (29) when updating of the lead position is suspended.

(Operation of Fourth Aspect of First Invention)

In the thus structured route lead guidance system (S) according to the fourth aspect of the first invention, the update instruction image setting means (e.g. toggle key image setting means KC18A) sets the update suspension instruction image (29a) that instructs suspension of updating of the lead position as the lead position update instruction image (29) when the lead position is being updated. Also, the update instruction image setting means (KC18B) sets the update instruction image (29b) that instructs execution of updating of the lead position as the lead position update instruction image (29) when updating of the lead position is suspended.

Accordingly, the route lead guidance system (S) according to the fourth aspect of the first invention instructs suspension of updating without error, providing no undesired instruction to execute updating during execution of updating of the lead position. In the same manner, the system instructs execution (resumption) of updating without error, providing no undesired instruction to suspend updating during suspension of updating.

The route lead guidance system (S) according to any of the first to fourth aspects of the first invention may include: an acceleration sensor (SN1) that detects acceleration; spectral analysis means (KC4C) that performs spectrum analysis based on an output signal of the acceleration sensor (SN1); walk detecting means (KC4) that detects the user's walking as a spectrum that is characteristic to walking is detected as a result of the spectrum analysis made by the spectral analysis means (KC4C); lead position moving distance calculating means (KC16C1) that calculates a moving distance of the lead position based a period for the spectrum analysis and a lead speed that is a moving speed of the lead position; and the lead position update means (KC16C) that executes updating of the lead position based on the moving distance of the lead position.

In the thus structured route lead guidance system (S), the acceleration sensor (SN1) detects acceleration that acts on the acceleration sensor (SN1). The spectral analysis means (KC4C) performs spectrum analysis based on an output signal of the acceleration sensor (SN1). The walk detecting means (KC4) detects the user's walking as a spectrum that is characteristic to walking is detected as a result of the spectrum analysis made by the spectral analysis means (KC4C). The lead position moving distance calculating means (KC16C1) calculates the moving distance of the lead position based a period for the spectrum analysis and a lead speed that is a moving speed of the lead position. The lead position update means (KC16C) executes updating of the lead position based on the moving distance of the lead position. In this case, walking is detected based on an output signal of the acceleration sensor (SN1), thereby detecting the moving distance of the lead position. Accordingly, the lead position can be updated under circumstances where receiving GPS signals is impossible.

Furthermore, in the route lead guidance system (S) according to any of the first to fourth aspects of the first invention, the lead speed is set faster than the user's moving speed. In this case, since the lead speed is set faster than the user's moving speed, the lead position is ahead (in front) of the user's current position on the route.

(Second Invention)

To address the above-mentioned technical problems, a portable route lead guidance device (1) according to a second invention includes: route storage means (e.g. a route guidance data storage means KC15B) that stores a route from a starting point to a destination; route guidance image creating means (KC18) that creates a route guidance image (24) including a route image (22) specifying the route, and a lead image (23) showing a lead position on the route ahead of a user's current position to lead the route; a display screen (11) that shows the route guidance image (24); walk detecting means (KC4) that detects the user's walking; lead position update means (KC16C) that updates the lead position in accordance with the user's walking as the user's walking is detected; the route storage means (route guidance data storage means KC15B) storing a guidance point located on the route at which guidance is provided to the user; guidance point arrival judging means (KC17C) that judges whether the lead position arrives at the guidance point on the route; and the lead position update means (KC16C) suspending updating of the lead position as the lead position arrives at the guidance point.

(Operation of Second Invention)

In the thus structured route lead guidance device (1) according to the second invention, when the walk detecting means (KC4) detects the user's walking, the lead position update means (KC16C) updates the lead position in accordance with the user's walking. The route guidance image creating means (KC18) creates the route guidance image (24) including the route image (22) specifying the route and the lead image (23) showing a lead position on the route ahead of the user's current position to lead the route. The display screen (11) shows the route guidance image (24).

The route lead guidance device (1) according to the second invention uses the lead image (23) to provide guidance towards the direction of the user's travel. Accordingly, the user can confirm buildings and signboards etc. in front of the user following his/her line of vision with the route guidance image (24). This system makes it less likely for the user to cause any confusion by the difference between the user's line of vision and the route guidance image (24).

The route lead guidance device (1) according to the second invention detects the user's walking to update the lead position. Accordingly, the system can provide guidance without error under circumstances where positioning based on GPS is impossible. Furthermore, the lead position is updated in conjunction with the detection of walking, making it less likely that the lead position moves too much.

In addition, updating of the lead position is suspended at the guidance point, whereby it is less likely that the guidance point moves too much apart from the current position of the user.

(Third Invention)

To address the above-mentioned technical problems, a route lead guidance program according to a third invention enables a computer to work as: route storage means (route guidance data storage means KC15B) that stores a route from a starting point to a destination, the route storage means (route guidance data storage means KC15B) storing a guidance point located on the route at which guidance is provided to a user; route guidance image creating means (KC18) that creates a route guidance image (24) including a route image (22) specifying the route, and a lead image (23) showing a lead position on the route ahead of a user's current position to lead the route; image display means (KC1) that displays the route guidance image (24) on a display screen (11); walk detecting means (KC4) that detects the user's walking; lead position update means (KC16C) that updates the lead position in accordance with the user's walking as the user's walking is detected; guidance point arrival judging means (KC17C) that judges whether the lead position arrives at the guidance point on the route; and the lead position update means (KC16C) suspending updating of the lead position as the lead position arrives at the guidance point.

(Operation of Third Invention)

In the thus structured route lead guidance program according to the third invention, the route storage means (route guidance data storage means KC15B) stores a route from a starting point to a destination. The walk detecting means (KC4) detects the user's walking. The lead position update means (KC16C) updates the lead position in accordance with the user's walking as the user's walking is detected. The route guidance image creating means (KC18) creates the route guidance image (24) including the route image (22) specifying the route and the lead image (23) showing the lead position on the route ahead of the user's current position to lead the route. The liquid crystal driving circuit control means (KC1) controls a liquid crystal driving circuit (KD1) to display the route guidance image (24) on the display screen (information display screen 11).

The route lead guidance program according to the third invention uses the lead image (23) to provide guidance towards the direction of the user's travel. Accordingly, the user can confirm buildings and signboards etc. in front of the user following his/her line of vision with the route guidance image (24). This system makes it less likely for the user to cause any confusion by the difference between the user's line of vision and the route guidance image (24).

The route lead guidance program according to the third invention detects the user's walking to update the lead position. Accordingly, the system can provide guidance without error under circumstances where positioning based on GPS is impossible. Furthermore, the lead position is updated in conjunction with the detection of walking, making it less likely that the lead position moves too much.

Advantages of the Invention

The present invention reduces the confusion of the user caused by the difference between the user's line of vision and the route guidance image.

The present invention also enables guidance without making mistakes on a route even in the situation where obtaining positional information by GPS is impossible.

DESCRIPTION OF THE PREFERRED EMBODIMENT

Next, a specific instance of one embodiment of the present invention will be described in reference to the drawings. However, the present invention is not limited only to the following specific embodiment.

First Embodiment

FIG. 1 is an illustration of a portable navigation system of a first embodiment of the present invention.

In FIG. 1, a portable navigation system (a route lead guidance system) S of the first embodiment includes a mobile telephone (a portable route guidance device) 1 as a portable terminal of a user. The mobile telephone 1 is connected to a data communication apparatus 3 of a mobile telephone service provider via a mobile telephone network 2. The data communication apparatus 3 is connected, via a leased line 4 and the Internet 6, to a portable navigation data delivery server (a route information delivery server) 7 and an information delivery server 8 of other information delivery service providers (content providers and application service providers). In the first embodiment, although the portable navigation data delivery server 7 is connected to the data communication apparatus 3 via the leased line 4, it may be connected via the Internet 6 as well.

The mobile telephone 1 includes an information display screen (a display) 11 for displaying a display image, input keys 12 enabling the user to make various entries, and a memory device (a record medium) in which programs and such are stored. The mobile telephone 1 of the first embodiment includes a built-in global positioning system (GPS) device capable of three-dimensional positioning of the current position of the mobile telephone.

Also, the portable navigation data delivery server 7 includes a server main body 16, a display (not shown), input devices including a keyboard and a mouse (not shown), a hard disk drive (a record medium, not shown), and an optical drive including a CD drive (a record media read device, not shown).

(Description of a Control Section of the Mobile Telephone 1)

FIG. 2 is a block diagram (a functional block diagram) of functions of the portable terminal in the portable navigation system of FIG. 1.

In FIG. 2, a controller KC of the mobile telephone 1 is composed of an I/O (an input/output interface) for handling external signal inputs and outputs and adjusting signal levels thereof and such, a read only memory (ROM, a record medium) in which programs, data and such are stored for executing required processes, a random access memory (RAM, a record medium) for storing necessary data temporarily, a central processing unit (CPU) that executes processing according to the programs stored in the ROM and such, and a microcomputer having a clock generator and such. The various functions can be performed by executing stored programs in the ROM and such.

(Signal Input Elements Connected to the Controller KC of the Mobile Telephone)

The controller KC of the mobile telephone 1 is fed signals from the input keys 12, the GPS device, an acceleration detecting device 13, and other signal input elements.

The input keys 12 detect an input signal entered by the user, and feed the detected signal to the controller KC.

The GPS device performs, in response to an input signal of positioning start, the positioning of the mobile telephone 1 on the ground on the basis of an arrival time and such of a radiowave of time signal emitted from a satellite, and feeds a positioning result into the controller KC.

The acceleration detecting device 13 includes an acceleration sensor SN1 and an acceleration sampling means KC0.

The acceleration sensor SN1 detects an acceleration of the mobile telephone 1 while moving (vibrations and such from the body movement associated in walking while the user walks). The acceleration sensor SN1 of the first embodiment detects accelerations in predefined orthogonal three-axis (X, Y and Z-axis) directions fixed relative to the mobile telephone 1. As the three-dimensional acceleration sensor capable of detecting accelerations in orthogonal three-axis directions is publicly known (for example, refer to Japanese Patent No. 3359781) and various sensors can be used, its detailed description is skipped.

The acceleration sampling means KC0 samples (analog to digital conversion) detected output signals from the acceleration sensor SN1 at a predefined sampling frequency fs. The acceleration sampling means KC0 of the first embodiment is set at the sampling frequency fs of 64 Hz.

(Control Elements Connected to the Controller KC of the Mobile Telephone)

The controller KC of the mobile telephone 1 is also connected to a liquid crystal driving circuit KD1, a GPS driving circuit KD2, a vibration motor control circuit (a vibration generator control circuit) KD3, a power supply circuit and other control elements not indicated in the drawing, and outputs their action control signals.

The liquid crystal driving circuit KD1 controls switching a display electrode of an LCD panel on and off to show display images on the information display screen 11.

The GPS driving circuit KD2 outputs a positioning start signal to the GPS device to drive the GPS device.

The vibration motor control circuit KD3 activates a vibration motor (a notifying device) Ml to vibrate the mobile telephone 1, when a telephone call is received or when it arrives at a guidance point and such while performing route guidance, to notify the user of a call received or a guidance point and such.

(Functions of the Controller KC of the Mobile Telephone)

The controller KC of the mobile telephone 1 has functions (control means) to output control signals to each of the control elements by executing the process according to the output signals from each of the signal output elements. The functions of the controller KC (the control means) will now be described. KC1: Liquid crystal driving circuit control means (a route guidance image display means)

A liquid crystal driving circuit control means KC1 controls the liquid crystal driving circuit KD1 to display images on the information display screen 11. KC2: Vibration motor control means (a notifying device control means)

A vibration motor control means KC2 controls to drive the vibration motor Ml through the vibration motor control circuit KD3.

KC3: GPS Control Means

A GPS control means KC3 drives the GPS device through the GPS driving circuit KD2.

KC4: Walk Detecting Means (a Walk Detecting Program)

A walk detecting means KC4 has an acceleration data storage means KC4A, a spectral analysis interval storage means KC4B, a spectral analysis interval timer TM0, a spectral analysis means KC4C, an analysis result storage means KC4D, and a walk judging means KC4E, and detects walking of the user carrying the mobile telephone 1 based on the detected output signal from the acceleration detecting device 13.

KC4A: Acceleration Data Storage Means

The acceleration data storage means KC4A reads and stores acceleration data sampled by the acceleration sampling means KC0 of the acceleration detecting device 13. The acceleration data storage means KC4A of the first embodiment is configured to store the acceleration data for a period of 0.5 seconds, thus 32 pieces of acceleration data sampled at a sampling frequency of 64 Hz. Upon reading the latest acceleration data, it erases the oldest acceleration data and stores the latest acceleration data.

KC4B: Spectral Analysis Interval Storage Means

The spectral analysis interval storage means KC4B stores a spectral analysis interval t0 that is an execution interval of spectral analyses. The spectral analysis interval storage means of the first embodiment stores a value of 0.5 seconds as the spectral analysis interval t0.

TM0: Spectral Analysis Interval Timer

The spectral analysis interval timer TM0 is set at the spectral analysis interval t0 and stops counting when the spectral analysis interval t0 has elapsed.

KC4C: Spectral Analysis Means

The spectral analysis means KC4C analyzes spectrums (power spectrums) by fast Fourier transform (FFT) after calculating a magnitude of acceleration (a total acceleration) based on the acceleration data stored in the acceleration data storage means KC4A. Additionally, the spectral analysis means (a FFT means, for example) KC4C of the first embodiment obtains spectral intensities at a 1-Hz interval in the frequency range of 1 to 32 Hz. As the FFT requires $2^n$ pieces of data, the FFT in the first embodiment is performed based on 32 ($2^5$) pieces of acceleration data.

KC4D: Analysis Result Storage Means

The analysis result storage means KC4D stores the result of the spectral analysis by the spectral analysis means KC4C.

KC4E: Walk Judging Means

The walk judging means KC4E judges whether walking spectrums (frequencies while walking) fw that are characteristic to walking are detected or not, from the result of the spectral analysis stored in the analysis result storage means KC4D. The walk judging means KC4E of the first embodiment judges as walking, as a result of the spectral analysis, when a spectral intensity equaling or exceeding a spectral intensity threshold Ns (in the first embodiment, Ns=1.0) in the frequency range of 1 to 4 Hz is measured.

KC11: Route Guidance Means (a Route Guidance Program)

A route guidance means KC11 has a route search condition entry image display means KC12, a route search condition storage means KC13, a terminal data transmitting means KC14, a terminal data receiving means KC15, a lead position detecting means KC16, a guidance point judging means KC17, and a route guidance image creating means KC18, and performs route guidance, according to the signal from GPS and the detection of walking and so on by displaying a route guidance image and such on the information display screen 11.

FIG. 3 is an illustration of a route search condition image of the first embodiment.

KC12: Route Search Condition Entry Image Display Means

The route search condition entry image display means KC12 creates and displays a route search condition entry image (refer to FIG. 3) for entering a route search condition including a starting point and a destination on the information display screen 11. In FIG. 3, the route search condition entry image of the first embodiment shows a starting point input field for entering the starting point, a destination input field for entering the destination, date and time input fields for entering a starting date and time or an arrival date and time of the route guidance, a search route number input field for entering the number of routes to search, a means of transportation input field for entering a means of transportation to be used for the route guidance, and a search condition transmission icon to execute transmission of the search condition to the server 7.

KC13: Route Search Condition Storage Means

The route search condition storage means KC13 stores the route search condition (starting point, destination, starting date and time, etc.) set by the entries to the route search condition entry image (refer to FIG. 3).

KC14: Terminal Data Transmitting Means

The terminal data transmitting means KC14 has a search condition transmitting means KC14A and transmits data from the mobile telephone 1 (the portable terminal) to the server 7.

KC14A: Search Condition Transmitting Means

The search condition transmitting means KC14A transmits the route search condition stored in the route search condition storage means KC12A to the server 7.

KC15: Terminal Data Receiving Means

The terminal data receiving means KC15 has a map data storage means KC15A and a route guidance data storage means KC15B, and receives and stores data transmitted from the server 7.

KC15A: Map Data Storage Means

The map data storage means KC15A stores map data transmitted from the server 7.

KC15B: Route Guidance Data Storage Means (a Route Storage Means)

The route guidance data storage means KC15B is a route storage means that stores route guidance data transmitted from the server 7 according to the route search condition. The route guidance data stored in the route guidance data storage means KC15B of the first embodiment includes route data including the distance and attributes (normal path, staircase, etc.) of the route to navigate the user, and the data for guidance points including intersections, corners, staircases, elevator accesses, and the destination.

KC16: Lead Position Detecting Means

The lead position detecting means KC16 has a lead position storage means KC16A, a lead speed setting means KC16B, a lead position update means KC16C, and a lead position update instruction judging means KC16D. The lead position detecting means KC16 detects a lead position on the route farther ahead of the current position of the user, in order to lead the user carrying the mobile telephone 1 on the route, based on the output signal from the GPS device and the judging of walking.

KC16A: Lead Position Storage Means

The lead position storage means KC16A stores the lead position. At the start of the route guidance, the current position of the user (the starting point) is stored as the lead position.

KC16B: Lead Speed Setting Means

The lead speed setting means KC16B has a lead speed storage means KC16B1 and a staircase judging means KC16B2, and sets, according to the user's walking, a moving speed (a lead speed) of the lead position that moves irrelevant to the current position of the user. The lead speed setting means KC16B of the first embodiment sets a normal lead speed described later as the lead speed when the path along which the lead position is moving is a normal path, and sets a staircase lead speed described later as the lead speed when the path is a staircase.

FIG. 4 is an illustration of a moving distance across a staircase.

KC16B1: Lead Speed Storage Means

The lead speed storage means KC16B1 stores the lead speed. The lead speed storage means KC16B1 of the first embodiment stores a value of 84 m/min. that is 5% faster than the general user's walking speed of 80 m/min. as the lead speed for a normal path (the normal lead speed), and stores a value of 42 m/min. that is one half the normal lead speed as the lead speed for a staircase (the staircase lead speed). In FIG. 4, as for the data of a route network used in route searching, when a route (a link) is a staircase, a projected distance on the horizontal plane (length L' in FIG. 4), instead of the actual distance of the route (length L in FIG. 4), is registered as a distance cost (a route link distance). Thus, for the staircase section of the route, when the moving distance is calculated using the normal lead speed, the lead position (and the current position) is apt to move too fast and an error gets to be increased. In general, when the user walks on a staircase, his/her walking pitch tends to become a little faster, but strides become shorter than that in a normal path. Therefore, the lead speed storage means KC16B1 of the first embodiment stores the speed of one half (½) the normal lead speed as the staircase lead speed. In the first embodiment, the staircase lead speed is set to ½ of the normal lead speed, but it is possible to set to an appropriate value, such as ⅓, not limited to ½. Also, the normal lead speed is set to the speed 5% faster than the general walking speed, but it is possible to set to any arbitrary values, not limited to this, such as 10% faster, and is also possible to set a lead speed based on the actual walking speed of the user derived from integrating the acceleration data.

KC16B2: Staircase Judging Means

The staircase judging means KC16B2 judges whether the route along which the lead position is moving is a staircase or not.

KC16C: Lead Position Update Means

The lead position update means KC16C has a lead position moving distance calculating means KC16C1 and, when the user's walking is detected by the walk detecting means KC4, updates the lead position according with the user's walking. The lead position update means KC16C of the first embodiment suspends updating the lead position when the lead position arrives at a guidance point or when instructed to suspend updating by the user entry. When it is instructed to execute updating by the user entry, while the lead position updating is suspended, it executes (resumes) updating the lead position.

KC16C1: Lead Position Moving Distance Calculating Means

The lead position moving distance calculating means KC16C1 calculates the moving distance of the lead position along the route when walking is detected, based on walking time (the duration of time to judge walking, 0.5 seconds in the first embodiment) and the lead speed set by the lead speed setting means KC16B.

KC16D: Lead Position Update Instruction Judging Means

The lead position update instruction judging means KC16D judges whether an instruction to execute updating or to suspend updating the lead position has been given by the user entry or not.

KC17: Guidance Point Judging Means

A guidance point judging means KC17 has a guidance distance calculating means KC17A, a guidance point approach judging means KC17B, and a guidance point arrival judging means KC17C, and judges, based on the data for guidance points of the route guidance data, whether the lead position has approached or arrived at a guidance point or not.

KC17A: Guidance Distance Calculating Means

The guidance distance calculating means KC17A calculates the distance from the lead position to the next guidance point on a route.

KC17B: Guidance Point Approach Judging Means

The guidance point approach judging means KC17B judges whether the distance to the guidance point has become less than a predefined approach judging distance or not. The guidance point approach judging means KC17B of the first embodiment stores a value of 100 m as the approach judging distance. The approach judging distance is not limited to 100 m, and it is possible to set at values such as 50 m, 300 m and so on. Also, the approach judging distance is not limited to have one single value, and it is possible to have a plurality of values (50 m, 100 m, 150 m, etc.) and to change the notifying methods (displaying image, flashing signal, driving the vibration motor, etc.) according to the distance values.

KC17C: Guidance Point Arrival Judging Means

The guidance point arrival judging means KC17C judges whether the lead position has arrived at a guidance point, thus the distance to the guidance point has become 0 (or less), or not.

FIG. 5 is an illustration of route guidance images. FIG. 5A illustrates a route guidance image immediately after the guidance started. FIG. 5B illustrates a route guidance image showing the lead position moving along the route. FIG. 5C illustrates a route guidance image when the user instructs to suspend updating the lead position in the state shown in FIG. 5B. FIG. 5D illustrates a route guidance image when the lead position has arrived at a corner as a guidance point. FIG. 5E illustrates a route guidance image when the lead position has arrived at a foot of stairs as a guidance point. FIG. 5F illustrates a route guidance image when the lead position has arrived at a head of stairs (climbed up position) as a guidance point. FIG. 5G illustrates a route guidance image when the lead position has approached the destination.

KC18: Route Guidance Image Creating Means

A route guidance image creating means KC18 has a toggle key image setting means KC18A and a lead image setting means KC18B, creates and displays on the information screen 11, route guidance images (refer to FIG. 5) to navigate the user (route guidance) based on data such as the lead position, map data, route data, data for judging approach to or arrival at guidance points. In FIG. 5, the route guidance image creating means KC18 of the first embodiment creates a route guidance image 24 having a map image 21, a route image 22, and a human-shaped lead icon (a lead image) 23 to indicate the lead position. According to the lead position, a starting point icon 26 (refer to FIG. 5A), a destination icon 27 (refer to FIG. 5G) are added in the route guidance image 24, and guidance icons 28 (refer to FIG. 5B to FIG. 5E) are also added to notify the user of turn directions on the route (refer to FIG. 5B to FIG. 5D), stairs to go up and down (refer to FIG. 5E) and so on. The route guidance image 24 has a toggle key image (a lead position update instruction image) 29 for the user to enter instructions, with the input keys (an update instruction input member) 12, to suspend or execute updating the lead position.

KC18A: Toggle Key Image Setting Means (an Update Instruction Image Setting Means)

The toggle key image setting means KC18A has a moving toggle key image storage means KC18A1 and a standby toggle key image storage means KC18A2, and is an update instruction image setting means that sets the toggle key image 29 displayed on the information display screen 11 depending on each state of executing and suspending updating of the lead position.

KC18A1: Moving Toggle Key Image Storage Means (an Update Suspension Instruction Image Storage Means)

In FIGS. 5A, 5B, and 5G, the moving toggle key image storage means KC18A1 stores a moving toggle key image (an update suspension instruction image) 29a that is the toggle key image 29 for the user to instruct to stop moving the lead icon 23 (to update suspension the lead position), while the lead position is updated (the lead icon 23 is moving).

KC18A2: Standby Toggle Key Image Storage Means (an Update Instruction Image Storage Means)

In FIG. 5C FIG. 5F, the standby toggle key image storage means KC18A2 stores a standby toggle key image (an update instruction image) 29b that is the toggle key image 29 for the user to instruct to resume moving the lead icon 23 (to execute updating the lead position), while updating the lead position is suspended (while the lead icon 23 is standing by (suspended moving)).

KC18B: Lead Image Setting Means

The lead image setting means KC18B has a moving lead icon storage means KC18B1 and a standby lead icon storage means KC18B2, and sets the lead icon 23 displayed on the information display screen 11 depending on each state of executing and suspending updating of the lead position.

KC18B1: Moving Lead Icon Storage Means (an Updated Lead Image Storage Means)

In FIGS. 5A, 5B, and 5G, the moving lead icon storage means KC18B1 stores a rear-facing human-shaped moving lead icon (an updated lead image) 23a, as the lead icon 23 indicating that the lead icon 23 is moving, while the lead position is updated (the lead icon 23 is moving).

KC18B2: Standby Lead Icon Storage Means (a Suspended Lead Image Storage Means)

In FIGS. 5C to 5F, the standby lead icon storage means KC18B2 stores a front-facing human-shaped standby lead icon (a suspended lead image) 23b, as the lead icon 23 indicating that the lead icon 23 is standing by (updating of the lead position is suspended), while the lead position is suspended updating (the lead icon 23 is standing by).

(Description of a Control Section of the Portable Navigation Data Delivery Server 7)

FIG. 6 is a block diagram (a functional block diagram) of server functions of the portable navigation system of the first embodiment.

In FIG. 6, a controller SC of the portable navigation data delivery server 7 is composed of an input/output interface (I/O) for handling external signal inputs and outputs and adjusting signal levels thereof and such, a read only memory (ROM, a record medium such as a hard disk) in which programs, data and such are stored for executing required processes, a random access memory (RAM, a record medium) for storing necessary data temporarily, a central processing unit (CPU) that executes processing according to the programs stored in the ROM and such, and a microcomputer having a clock generator and such. The various functions can be performed by executing stored programs in the ROM and such.

(Signal Input Elements Connected to the Controller SC of the Server)

The controller SC of the portable navigation data delivery server 7 is fed signals from input devices such as a keyboard and a mouse (not shown) and other signal input elements.

The input devices detect input signals entered by the user, and feed the detected signal to the controller SC.

(Control Elements Connected to the Controller SC of the Server)

The controller SC of the portable navigation data delivery server 7 is also connected to a display (not shown), a power supply circuit and other control elements not indicated in the drawing, and outputs their action control signals.

The display shows display images according to operations of the server user.

(Functions of the Controller SC of the Server)

The controller SC of the portable navigation data delivery server 7 has a portable navigation application program for processing data transmitted from the mobile telephone 1, and other programs and the like, and has functions (control means) to output control signals to each of the control elements by executing the process according to the output signals from each of the signal output elements. The functions (the control means) of the portable navigation application program of the controller SC will now be described.

SC1: Server Data Receiving Means

A server data receiving means SC1 has a search condition receiving means SC1A and receives data transmitted from the mobile telephone 1.

SC1A: Search Condition Receiving Means

The search condition receiving means SC1A receives and stores the search condition data transmitted from the mobile telephone 1.

SC2: Map Data Storage Means

A map data storage means SC2 stores map data. The map data stored in the map data storage means SC2 of the first embodiment is composed of unit map data that have been segmented to unit maps of predefined areas based on the latitude and longitude. As the technologies to segment a map to unit maps, and to send and receive necessary unit map data are publicly known (for example, refer to JP-A-2003-214860), a detailed description is omitted. The map data of the first embodiment used is vector map data where roads, paths and such are composed of vector data.

SC3: Route Search Means

A route search means SC3 has a guidance point extracting means SC3A, determines (searches) a route starting from the starting point to the destination, and creates the data of an optimal route (route data) that includes starting point data indicating the starting point and destination data indicating the destination. In the route search condition, when the use of public transportation is specified, an optimal route including public transportation is created. When a plurality of search routes are specified, the numbers of routes that correspond to the specified number are created. As the technologies to create an optimal route is publicly known (for example, refer to JP-A-2003-214860), a detailed description is omitted.

SC3A: Guidance Point Extracting Means

The guidance point extracting means SC3A extracts (searches and sets) points of guidance (guidance points) including corners, intersections, foot and head of stairs, accesses to elevators and escalators and a destination, on each of the routes searched by the route search means. As for the technologies to extract guidance points, since some conceivable technologies are available, a detailed description is omitted.

SC4: Server Data Transmitting Means

A server data transmitting means SC4 has a route guidance data transmitting means SC4A and a map data transmitting means SC4B, and transmits data to the mobile telephone 1.

SC4A: Route Guidance Data Transmitting Means

The route guidance data transmitting means SC4A transmits route guidance data, including the route data and the data for guidance points searched by the route search means SC3, to the mobile telephone 1.

SC4B: Map Data Transmitting Means

The map data transmitting means SC4B transmits the map data of the route searched by the route search means SC3 to the mobile telephone 1.

(Description of a Flowchart)
(Description of a Flowchart of the Server)

FIG. 7 is a main flowchart of a guidance route creating process of the server in the portable navigation system of the first embodiment.

The process of each ST (step) in the flowchart of FIG. 7 is executed in accordance with a portable navigation application program AP4 stored in the ROM and such of the controller SC of the server 7. This process is run in parallel with various other processes of the server 7.

The process of the flowchart shown in FIG. 7 is started by turning on the portable navigation data delivery server 7.

In ST1 of FIG. 7, whether the data of the route search condition transmitted from the mobile telephone 1 has been received or not is judged. In case of Yes (Y), the process moves on to ST2. In case of No (N), ST1 is repeated.

In ST2, the route corresponding to the route search condition is searched. Then, the process moves on to ST3.

In ST3, guidance points on the searched route are extracted. Then, the process moves on to ST4.

In ST4, the route data, the data for the guidance points and the map data on the route are transmitted to the mobile telephone (the portable terminal) 1. Then, the process moves back to ST1.

(Description of a Flowchart of the Portable Terminal)
(Description of a Flowchart of the Route Guidance Process)

FIG. 8 is a flowchart of a route guidance process provided by the mobile telephone in the portable navigation system of the first embodiment.

FIG. 9 is a flowchart continued from the route guidance process in FIG. 8.

The process of each ST (step) in the flowcharts of FIGS. 8 and 9 is executed in accordance with the route lead guidance program stored in the ROM and such of the controller KC. This process is run in parallel with various other processes of the mobile telephone 1.

The route guidance process of the flowcharts shown in FIGS. 8 and 9 is started by starting a navigation program (the route lead guidance program).

In ST11 of FIG. 8, the route search condition entry image (refer to FIG. 3) is displayed on the information display screen 11. Then, the process moves on to ST12.

In ST12, whether an input to select the search condition transmission icon "start search" in the route search condition entry image has been entered or not is judged. In case of No (N), the process moves on to ST13. In case of Yes (Y), the process moves on to ST15.

In ST13, whether the other entries, that is, the entries to each of the input fields (destination, etc.) of the route search condition entry image shown in FIG. 3, have been entered or not is judged. In case of Yes (Y), the process moves on to ST14. In case of No (N), the process moves back to ST12.

In ST14, the route search condition entry image shown in FIG. 3 is updated according to the user entry at the ST13. Then, the process moves back to ST12.

In ST15, the route search condition data that user has entered is transmitted to the route guidance data delivery server 7. Then, the process moves on to ST16.

In ST16, whether the route guidance data (the route data and the data for guidance points) and the map data that are the results of the route search have been received or not is judged. In case of Yes (Y), the process moves on to ST17. In case of No (N), ST16 is repeated.

In ST17, the received route guidance data and the map data that are the results of the route search are stored. Then, the process moves on to ST18.

In ST18, the following processes (1) to (3) are executed and then the process moves on to ST19.
(1) A route guidance image (refer to FIG. 5A) is created based on the starting point, the route data and the map data.
(2) The moving toggle key image ("STOP" icon) 29a is set as the toggle key image 29 and displayed on the information display screen 11.
(3) The moving lead icon 23a is set and displayed as the lead icon 23 on the information display screen 11.

In ST19 of FIG. 9, whether walking of the user has been detected or not is judged through a walk detecting process in FIG. 10 described later. In case of No (N), the process moves on to ST20. In case of Yes (Y), the process moves on to ST22.

In ST20, whether an input to select "STOP" toggle key (the moving toggle key image 29a) has been entered or not with the input keys 12 is judged. In case of No (N), the process moves on to ST21. In case of Yes (Y), the process moves on to ST30.

In ST21, whether an input to terminate the route lead guidance program has been entered or not is judged. In case of No (N), the process moves back to ST19. In case of Yes (Y), the route lead guidance program shown in FIGS. 8 and 9 is terminated.

In ST22, whether the route along which the lead position is moving is a staircase section or not is judged. In case of No (N), the process moves on to ST23. In case of Yes (Y), the process moves on to ST24.

In ST23, the lead speed is set to the normal lead speed, and then the process moves on to ST25.

In ST24, the lead speed is set to the staircase lead speed, and then the process moves on to ST25.

In ST25, the following processes (1) to (3) are executed, and then the process moves on to ST26.
(1) The moving distance of the lead position is calculated based on walking time (the duration of time to judge walking, 0.5 seconds in the first embodiment) and the lead speed set.
(2) The lead position is updated along the route based on the moving distance and the data for the lead position.
(3) The route guidance image 24 is updated based on the lead position, the route data, and the map data and such.

In ST26, the distance from the lead position to the next guidance point is calculated, and then the process moves on to ST27.

In ST27, whether the distance to the guidance point is less than the approach judging distance or not is judged. In case of Yes (Y), the process moves on to ST28. In case of No (N), the process moves on to ST29.

In ST28, the guidance icon 28 according to the next guidance point is added to the route guidance image 24. Then, the process moves on to ST29.

In ST29, whether the lead position has arrived at the guidance point or not is judged. In case of No (N), the process moves back to ST19. In case of Yes (Y), the process moves on to ST30.

In ST30, the following processes (1) and (2) are executed, and then the process moves on to ST31.
(1) The toggle key 29 is updated to the standby toggle key image ("GO" toggle key) 29b.
(2) The lead icon 23 is updated to the standby lead icon 23b.

In ST31, whether the lead position is at the destination or not is judged. In case of No (N), the process moves on to ST32. In case of Yes (Y), the process moves on to ST34.

In ST32, whether an input to select "GO" toggle key (the standby toggle key image 29b) has been entered or not with the input keys 12 is judged. In case of No (N), ST32 is repeated. In case of Yes (Y), the process moves on to ST33.

In ST33, the following processes (1) and (2) are executed, and then the process moves back to ST19.
(1) The toggle key image 29 is updated to the moving toggle key image ("STOP" toggle key) 29a.
(2) The lead icon 23 is updated to the moving lead icon 23a.

In ST34, whether an input to terminate the route lead guidance program has been entered or not is judged. In case of No (N), ST34 is repeated. In case of Yes (Y), the route lead guidance program shown in FIGS. 8 and 9 is terminated.

(Description of a Flowchart of the Walk Detecting Process)

FIG. 10 is a flowchart of the walk detecting process provided by the mobile telephone in the portable navigation system of the first embodiment.

The process of each ST (step) in the flowchart of FIG. 10 is executed in accordance with the program stored in the ROM and such of the controller KC. This process is run in parallel with various other processes (e.g. the route lead guidance process) of the mobile telephone 1.

The process of the flowchart shown in FIG. 10 is started by starting a navigation program (the route lead guidance program).

In ST41 of FIG. 10, the acceleration data output from the acceleration detecting device 13 is started to be read and stored. Then, the process moves on to ST42.

In ST42, the spectral analysis interval timer TM0 is set at the spectral analysis interval t0. Then, the process moves no to ST43.

In ST43, whether the spectral interval timer TM0 has suspended counting or not is judged. In case of No (N), ST43 is repeated. In case of Yes (Y) process moves on to ST44.

In ST44, the spectrum analysis is performed by the fast Fourier transform (FFT) after calculation of the magnitude of acceleration based on the acceleration data stored. Then, the process moves on to ST45.

In ST45, from the result of the FFT analysis, whether the spectrum that has the spectral intensity at or over the spectral intensity threshold Ns within the frequency range of 1 to 4 Hz is judged. In case of Yes (Y), the process moves on to ST46. In case of No (N), the process moves on to ST47.

In ST46, it is judged that the user has walked, thus walking is detected. Then, the process moves on to ST48.

In ST47, it is judged that the user is not walking and stops. Then, the process moves on to ST48.

In ST48, whether an input to terminate the navigation program (the route lead guidance program) has been entered or not is judged. In case of No (N), the process moves on to ST42. In case of Yes (Y), the walk detecting process shown in FIG. 10 is terminated.

Operation of the First Embodiment

FIG. 11 is an example graph of the acceleration data measured on the mobile telephone while the user is walking carrying the portable terminal of the first embodiment, with the acceleration on the vertical axis and the time on the horizontal axis.

FIG. 12 is a graph of the spectral analysis result of the acceleration data in FIG. 11, with the spectral intensity on the vertical axis and the spectral value on the horizontal axis.

In FIGS. 11 and 12, with the portable navigation system (the route lead guidance system) S of the first embodiment configured as described, when the user walks carrying the mobile telephone 1 while the route lead guidance program is running, the cyclic acceleration in the direction of three axes of X-axis, Y-axis and Z-axis are detected by the three-axis acceleration sensor SN1. The cyclic acceleration data detected by the acceleration sensor SN1 are sampled at a sampling frequency of 64 Hz (refer to FIG. 11). Then, when the spectral analysis of the total acceleration that is the magnitude of acceleration on the three-axis directions (refer to FIG. 11) for a duration of 0.5 seconds is made by the fast Fourier transform (FFT), as indicated in FIG. 12, the result of the spectral analysis obtained shows strong spectral intensities at frequencies of 2 Hz and 3 Hz. When such a result is obtained, it is judged that the user has walked, thus the mobile telephone 1 detects walking.

In the step ST19 in FIG. 9 (the walk detecting process in FIG. 10), when walking is detected, the lead position is updated irrelevant to the current position of the user. At this time, as the lead speed is set faster than the general user's walking speed, the lead icon 23a moves ahead of the current position of the user along the route (refer to FIG. 5A). Therefore, as the lead icon 23a moves ahead of the user, buildings and the like ahead of the route are displayed in the route guidance image 24, thus the user can confirm them. This method makes the user less likely to get confused from the difference between the line of his/her vision and the route guidance image 24.

When the lead position approaches a guidance point such as corners, foot and head of stairs and so on, the guidance icon 28 is indicated giving the guidance to the user (refer to FIG. 5B). While the lead icon 23a is moving, selecting the "STOP" toggle key (the moving toggle key image 29a), when the user feels that the lead position and the current position are too far apart, makes it shift from the status indicated in FIG. 5B to the status indicated in FIG. 5C, updating the moving lead icon 23a to the standby lead icon 23b and stopping the movement of the lead icon 23 (refer to ST20 in FIG. 9). At this time, as the toggle key image 29 has been updated to the "GO" toggle key (standby toggle key image 29b) automatically, selecting the toggle key by the user makes it change from the status indicated in FIG. 5C to the status indicated in FIG. 5B (refer to ST32 and such in FIG. 9) resuming the movement of the lead icon 23. Thus, in the route lead guidance system of the first embodiment, as to stop or to resume the movement of the lead icon 23 is instructed by the same input action of selecting the toggle key, the user can easily make the instructions. Since the lead icon 23 and the toggle key image 29 differ between the moving and standing by states, the user can easily confirm if the route lead guidance is in progress or in standby (the lead position is being updated or not).

In FIGS. 5D to 5F, when the lead position moves along the route and arrives at a guidance point such as corners, foot and head of stairs and such, the lead icon 23 stops moving automatically (refer to ST29 and such in FIG. 9). Thus, the lead icon 23 arrives at the guidance point earlier and waits for the user. When the user confirms the guidance point and enters to the select "GO" toggle key (the standby toggle key image 29b) as he/she approaches or arrives at the guidance point, updating the lead position is resumed and the lead icon 23a moves on towards the next guidance point. Therefore, with the route lead guidance system of the first embodiment, as it suspends updating the lead position automatically at every guidance point, and resumes moving the lead icon 23 according to the user entry, it allows the user to confirm the guidance point and it reduces the occasion where the lead position and the current position of the user become too far apart as the lead icon 23a moves too much.

As the route lead guidance system S of the first embodiment updates the lead position by detecting walking of the user, the route guidance can be given even in underground and inside the buildings and the like where the reception of the GPS radiowave is impossible. Further, as the route lead guidance system S of the first embodiment does not require devices for obtaining the current position within the buildings as in the case of the related art, it makes it easy to implement and reduces the costs required for the equipment.

As the route lead guidance system S of the first embodiment updates the lead position by detecting walking of the user, it prevents the occasion where the lead position and the current position of the user become too far apart as the lead position moves on its own while the user is standing still.

INDUSTRIAL APPLICABILITY

Modification Examples

The preferred embodiment of the present invention has been described above. However, the present invention is not limited to the preferred embodiment, and various modifications can be made within the spirit and scope of the claims of the present invention.

For example, in the first embodiment, although the portable route guidance device with the GPS device has been described, the invention is also applicable to the portable route guidance device without the GPS device.

In the first embodiment, although only the lead position is detected and the current position of the user is not detected, it is also possible to detect the current position of the user and add the current position icon for indicating the current position on the route guidance image 24 in addition to the lead icon 23. In this case, for instance, when the lead position becomes too far apart from the current position (300 m or more apart, for example), it can be configured to automatically suspend updating the lead position until the current position comes closer to some extent to the lead position.

Further, the portable route guidance device of the present invention is not limited to the mobile telephone 1, but it is applicable to portable devices (the portable route guidance device) such as a PDA and a personal notebook computer. In addition to these, this function can also be implemented on a portable music player (a headphone stereo, MP3 player, and such) and the like.

In the first embodiment, the delivery of the map data and the search of routes have been done by the communication with the portable navigation data delivery server 7. However, when the data storage capacity and the processing speed of the portable route guidance device are sufficient enough, the portable route guidance device can store the whole map data and search routes, allowing the communication with the portable navigation data delivery server 7 to be omitted. Conversely, it can also be configured for the mobile telephone 1 to perform the detecting of walking and for the portable navigation data delivery server 7 to perform updating of the lead position, the guidance point approach and arrival, and the creation of route guidance images and so on, so that the route guidance images transmitted from the portable navigation data delivery server 7 to be displayed on the mobile telephone 1.

In the first embodiment, although the moving distance has been calculated based on the lead speed and the walking time, not limited to this, it is possible to calculate the moving distance based on the stride (a moving distance of the lead position per step) and the number of steps that has been counted by detecting the peaks of vibrations from the acceleration data. Instead, by storing the plural number of lead speeds for walks at a quick pace, at a slow pace and so on, it is possible to select the walk speed to use depending on the spectrum value detected by the spectral analysis. Conversely, it is also possible to use the normal lead speed only. For example, it is possible to calculate the moving distance by setting the walk speed at a value of 60 m/min. when the most powerful spectrum value is found at 1.5 Hz or less and at the value of 100 m/min. when the most powerful spectrum is found at 3 Hz or more. It is also possible to configure it to input the lead speed directly by the user or to configure it to input the walk speed so that the lead speed is set at a value of 10% more than the walk speed entered.

In the first embodiment, the specific values such as the value of sampling frequency, the duration for storing acceleration data, the value of spectral intensity threshold are not limited to the values indicated above, and they can be changed.

Further, in the first embodiment, although the walking spectrums fw for detecting walking have been set in a frequency range of 1 to 4 Hz, not limited to this range, it can be set at 2 Hz when it is not required to detect walking at a quick pace and a slow pace, and set in a range of 1.5 to 2.5 Hz when it is not required to detect walking at a quick pace.

In the first embodiment, the walk detecting storage means KC4 is described as the module having the acceleration data storage means KC4A, the spectral analysis means KC4C, the analysis result storage means KC4D, and the walk judging means KC4E. However, the acceleration data storage means KC4A, the spectral analysis means KC4C, and such can be configured as a separate module. In this case, the walk detecting means KC4 should be configured to obtain necessary information from the module having the acceleration data storage means KC4A, the spectral analysis means KC4C, and such.

In the first embodiment, although the lead icons are switched for updating and for suspending updating, it is possible to use the same icon for both. Also, the lead icon is not limited to the human-shaped image, and it is possible to use any arbitrary lead images.

Further, in the first embodiment, as for the lead position update instruction image, the toggle key images that automatically switch between "STOP" and "GO" sequentially at every entry are used. However, it is not limited to this. For example, while showing both images of "STOP" and "GO", it is possible to process only one side and not to process the other when the input is entered.

In addition, in the first embodiment, while the route lead guidance on the route including a staircase is described, the invention is also applicable to the route lead guidance including an escalator, an elevator and other transfer means where the detection of walking is rather difficult. For example, at first, the route lead guidance to the floor where an access to an escalator and such is located is performed, and when the lead position arrives at the access to the escalator (a guidance point), the toggle key is switched from "STOP" to "GO". When the user gets off the escalator and such and selects to enter the "GO" toggle key, the route lead guidance of the floor where the user has got off the escalator can be performed. As a result of this, the route lead guidance can be performed even when the transfer means such as an escalator are used.

In the first embodiment, although the lead position is suspended updating when arriving at a guidance point, the position can be continuously updated. Further, although updating of the lead position is executed and suspended according to the instruction of the user entry, this configuration can also be omitted.

In the first embodiment, although walking is detected by using the three-dimensional acceleration sensor, not limited to this, it is possible to detect walking using two-dimensional acceleration sensors or other configurations that can detect walking.

Further, in the first embodiment, although the guidance icon is displayed when approaching a guidance point, not limited to this, it is also possible to notify the user the lead position has approached or arrived at the guidance point by any arbitrary methods such as flashing signals, driving the vibration motor, playing back sound effects, or the combination thereof.

Also, the guidance icons displayed on the display screen 11 can be configured by contents such as animations and movies, besides the still images. To playback such guidance icons, when the route lead guidance device 1 is a mobile telephone, for example, the application platform called Macromedia Flash Player of Macromedia can be used.

BRIEF DESCRIPTION OF THE DRAWINGS

FIG. 3 is an illustration of a route search condition image of the first embodiment.

FIG. 5A illustrates a route guidance image immediately after the guidance started.

FIG. 5B illustrates a route guidance image showing the lead position moving along the route.

FIG. 5C illustrates a route guidance image when the user instructs to update suspension the lead position in the state shown in FIG. 5B.

FIG. 5D illustrates a route guidance image when the lead position has arrived at a corner as a guidance point.

FIG. 5E illustrates a route guidance image when the lead position has arrived at a foot of stairs as a guidance point.

FIG. 5F illustrates a route guidance image when the lead position has arrived at a head of stairs (climbed up position) as a guidance point.

FIG. 5G illustrates a route guidance image when the lead position has approached the destination.

REFERENCE NUMERALS

Figure 1:
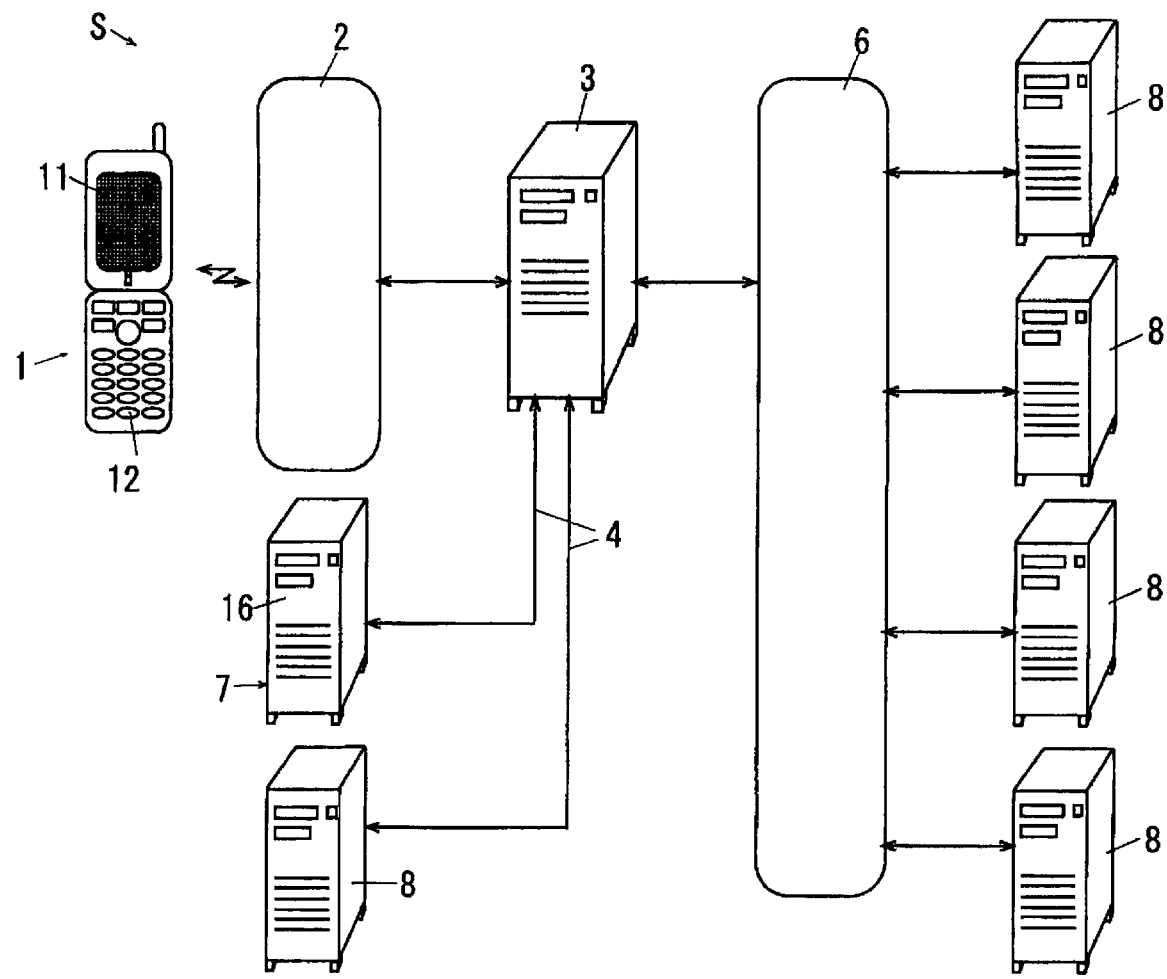
FIG. 1 is an illustration of a portable navigation system of the first embodiment of the present invention.
Figure 2:
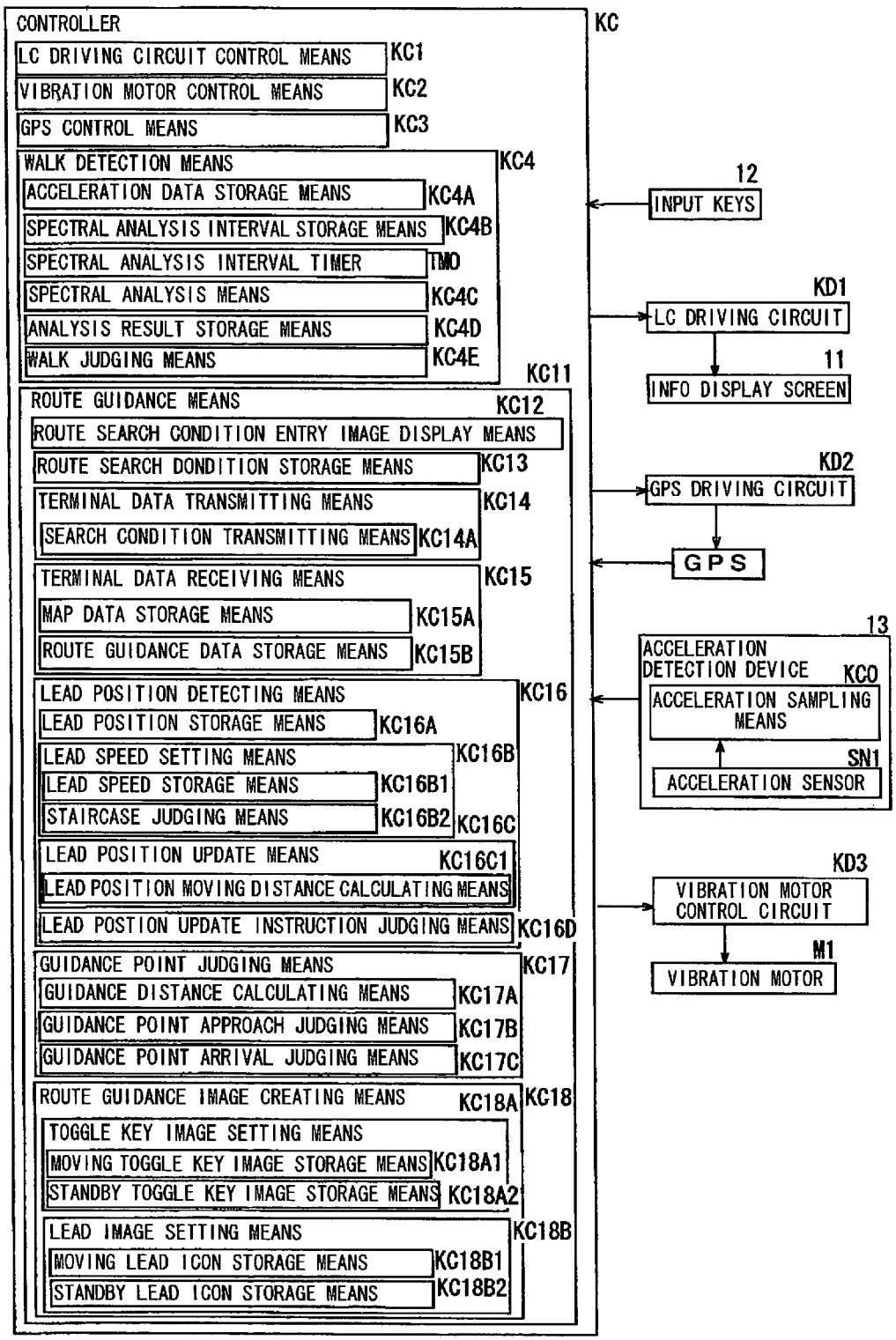
FIG. 2 is a block diagram (a functional block diagram) of functions of the portable terminal in the portable navigation system of FIG. 1.
Figure 4:
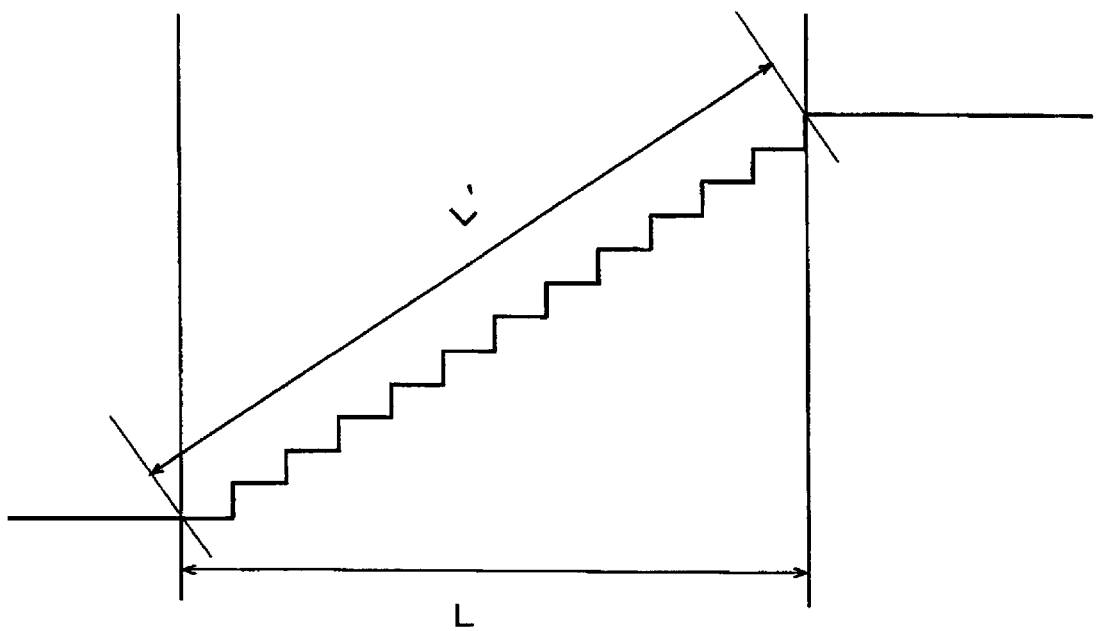
FIG. 4 is an illustration of a moving distance across a staircase.
Figure 5:
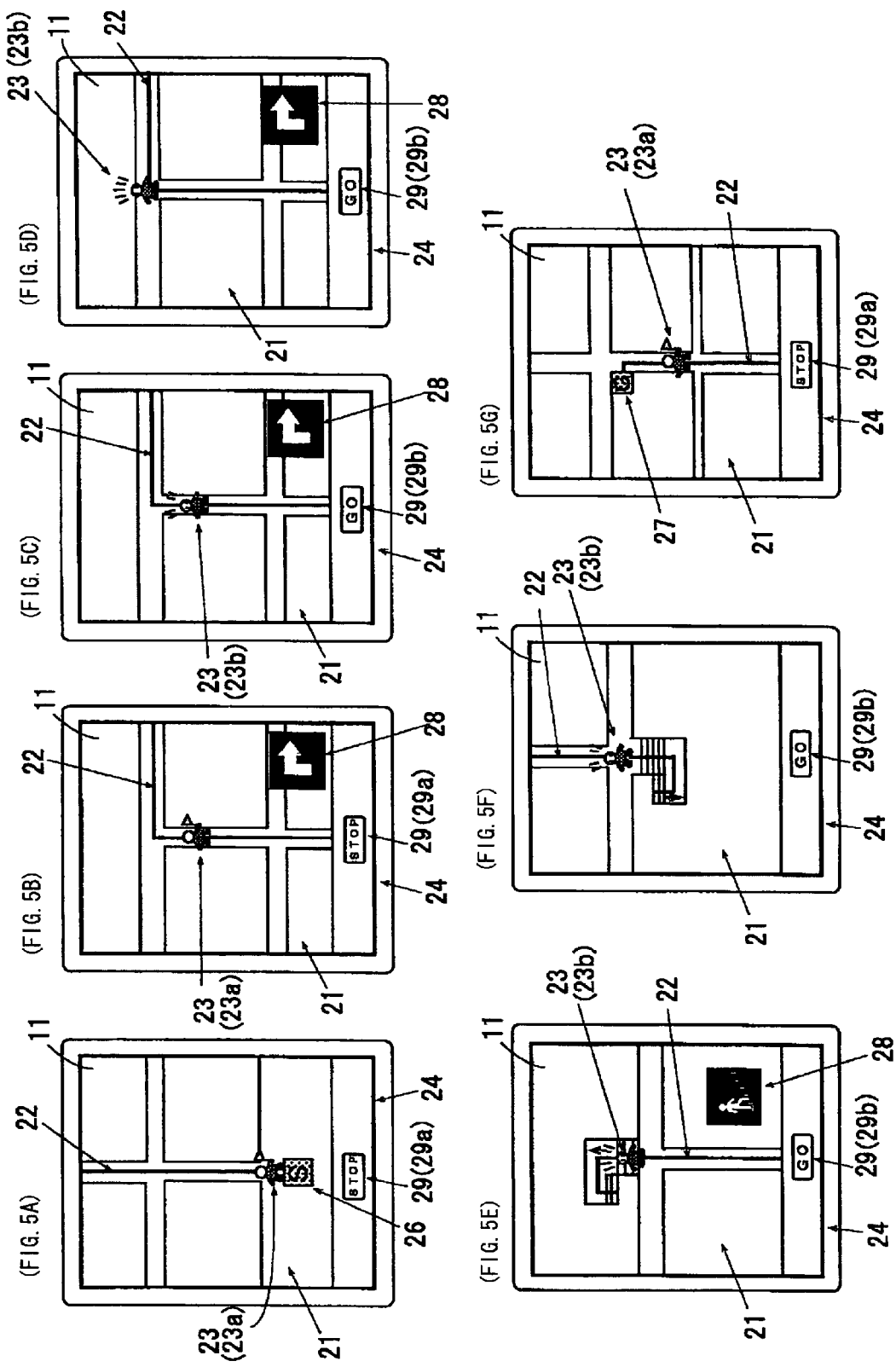
FIG. 5 is an illustration of route guidance images.
Figure 6:
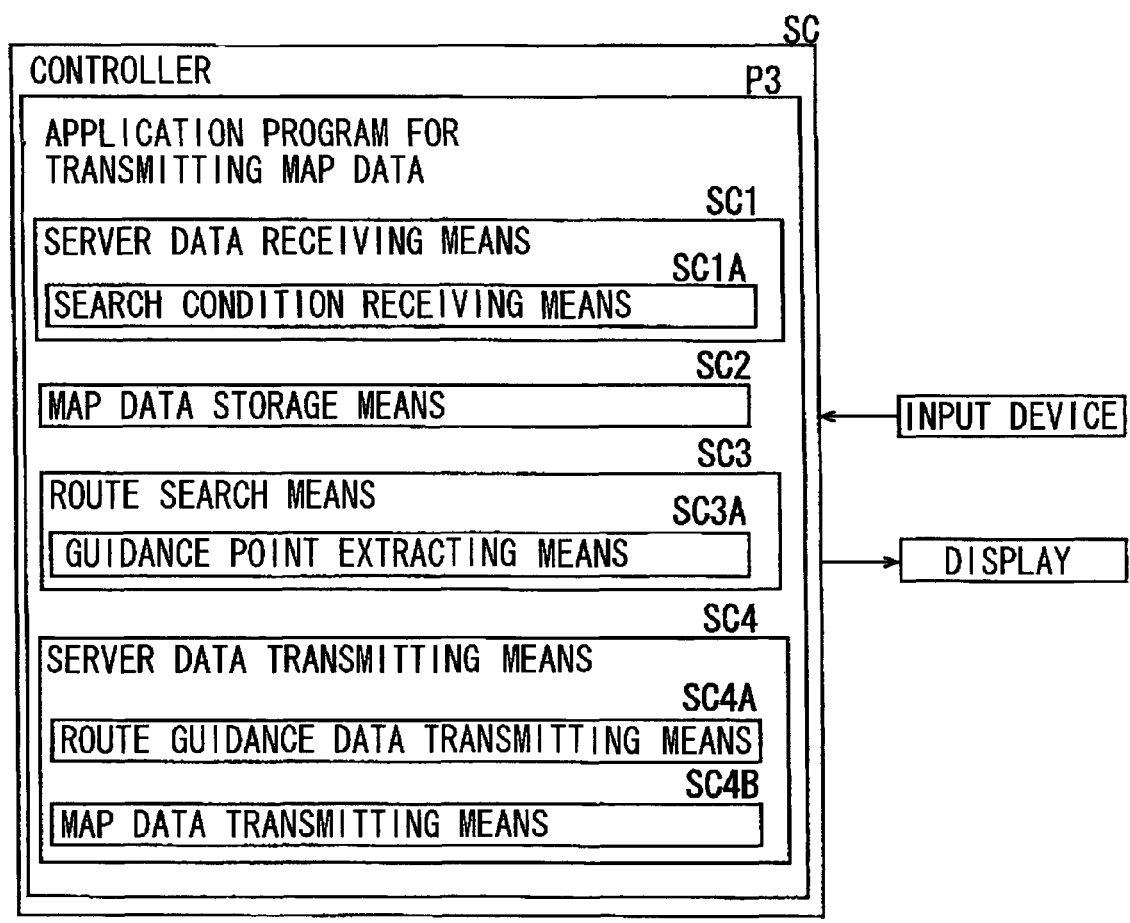
FIG. 6 is a block diagram (a functional block diagram) of server functions of the portable navigation system of the first embodiment.
Figure 7:
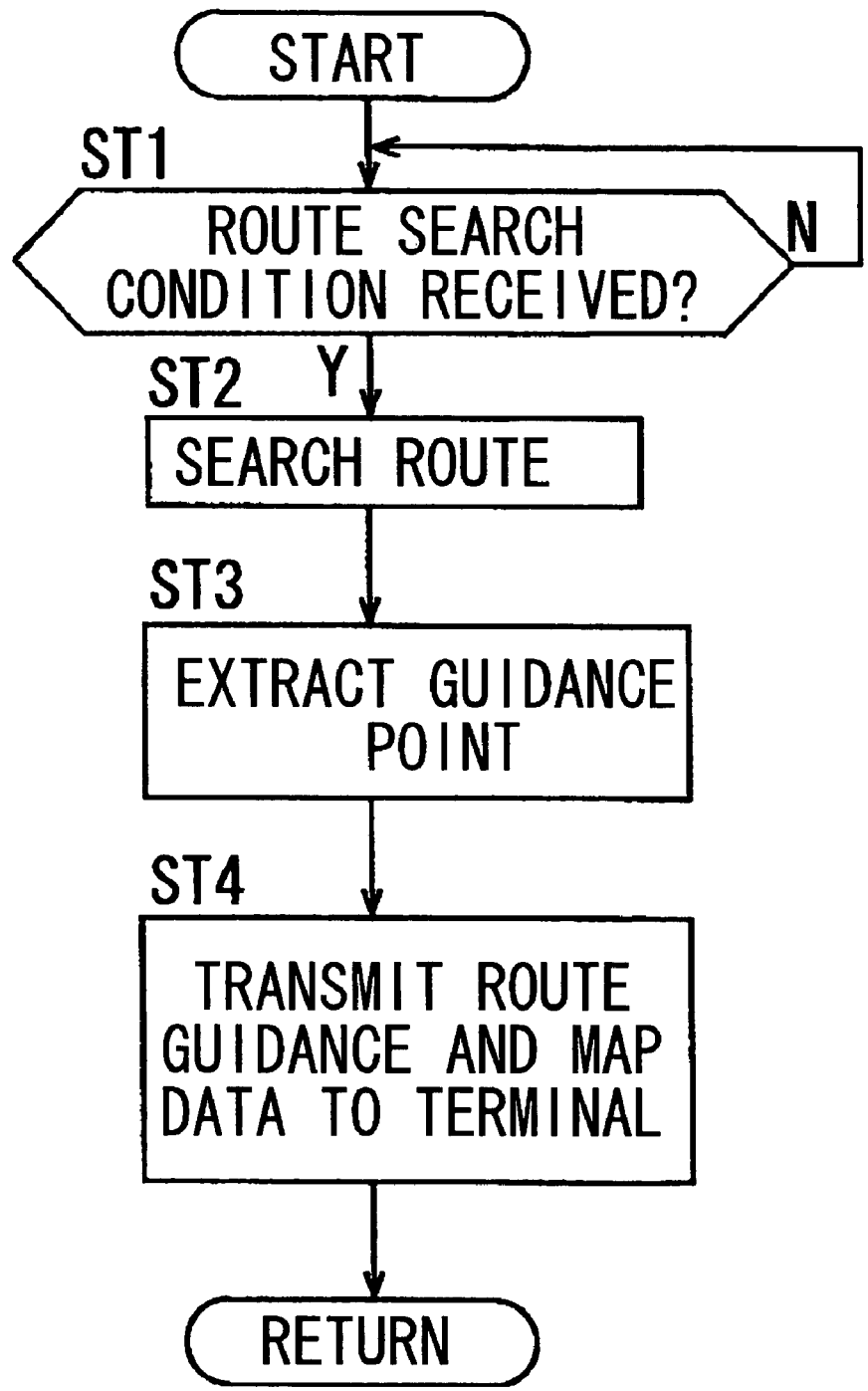
FIG. 7 is a main flowchart of a guidance route creating process of the server in the portable navigation system of the first embodiment.
Figure 8:
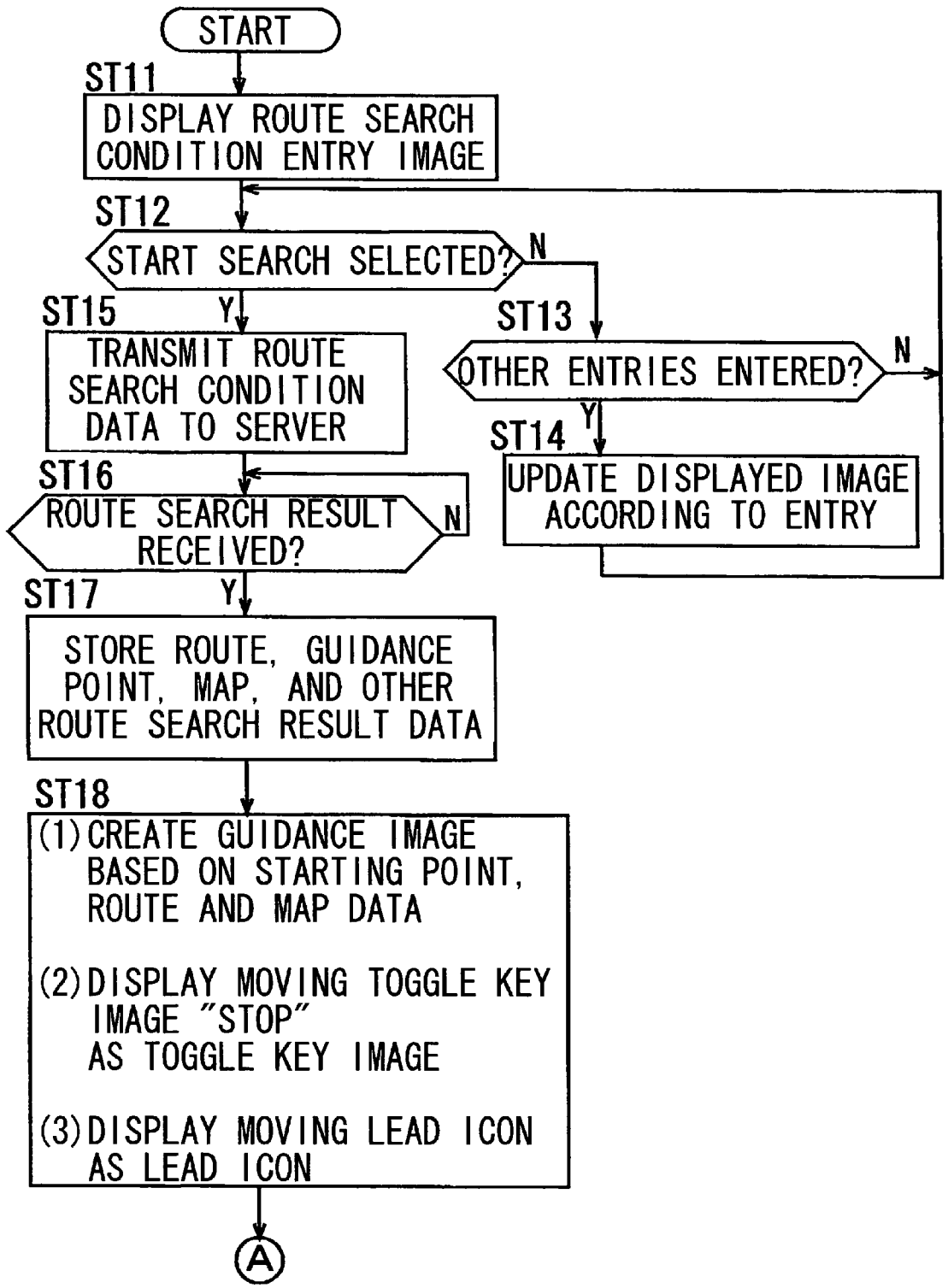
FIG. 8 is a flowchart of a route guidance process provided by the mobile telephone in the portable navigation system of the first embodiment.
Figure 9:
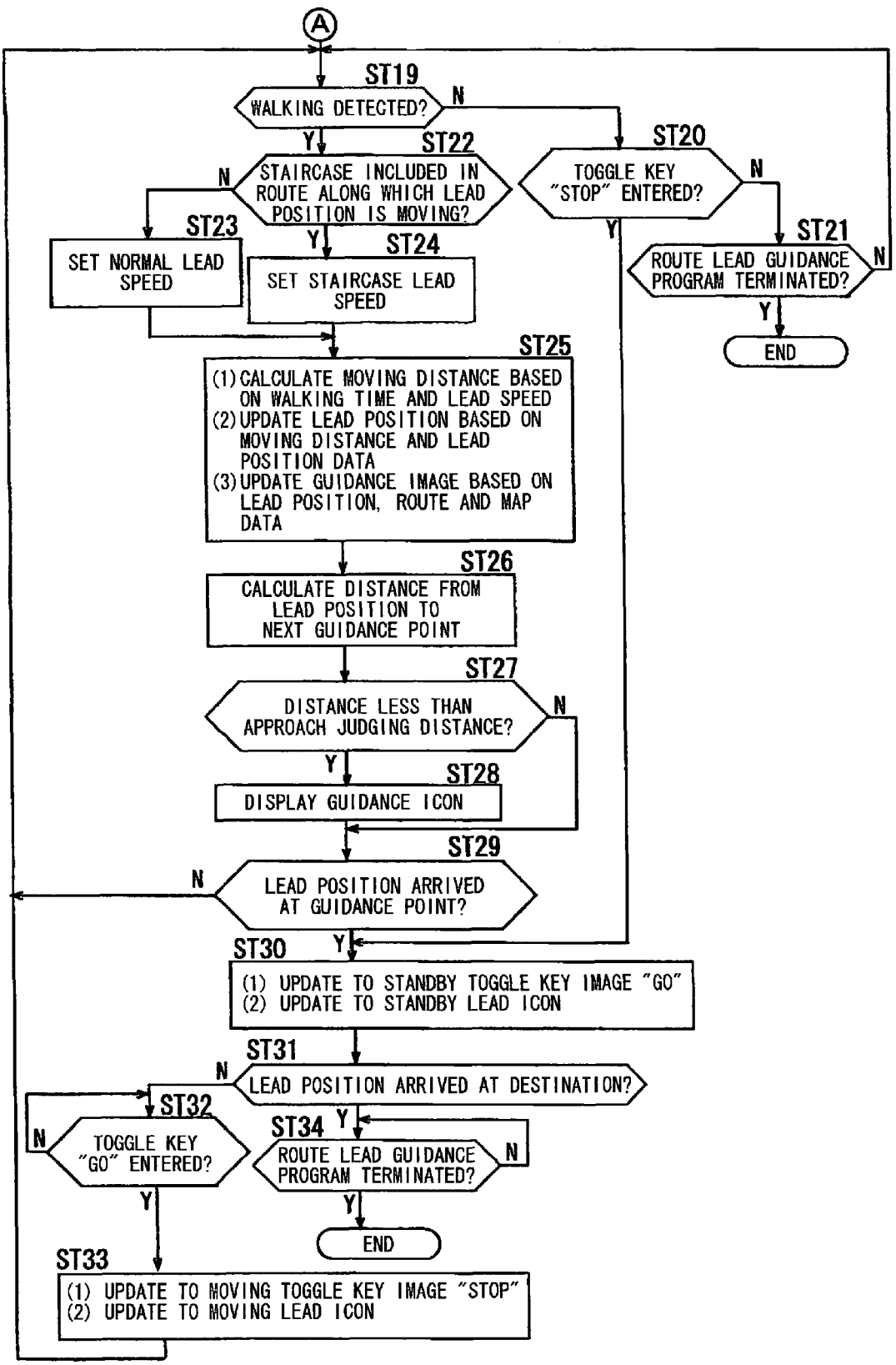
FIG. 9 is a flowchart continued from the route guidance process in FIG. 8.
Figure 10:
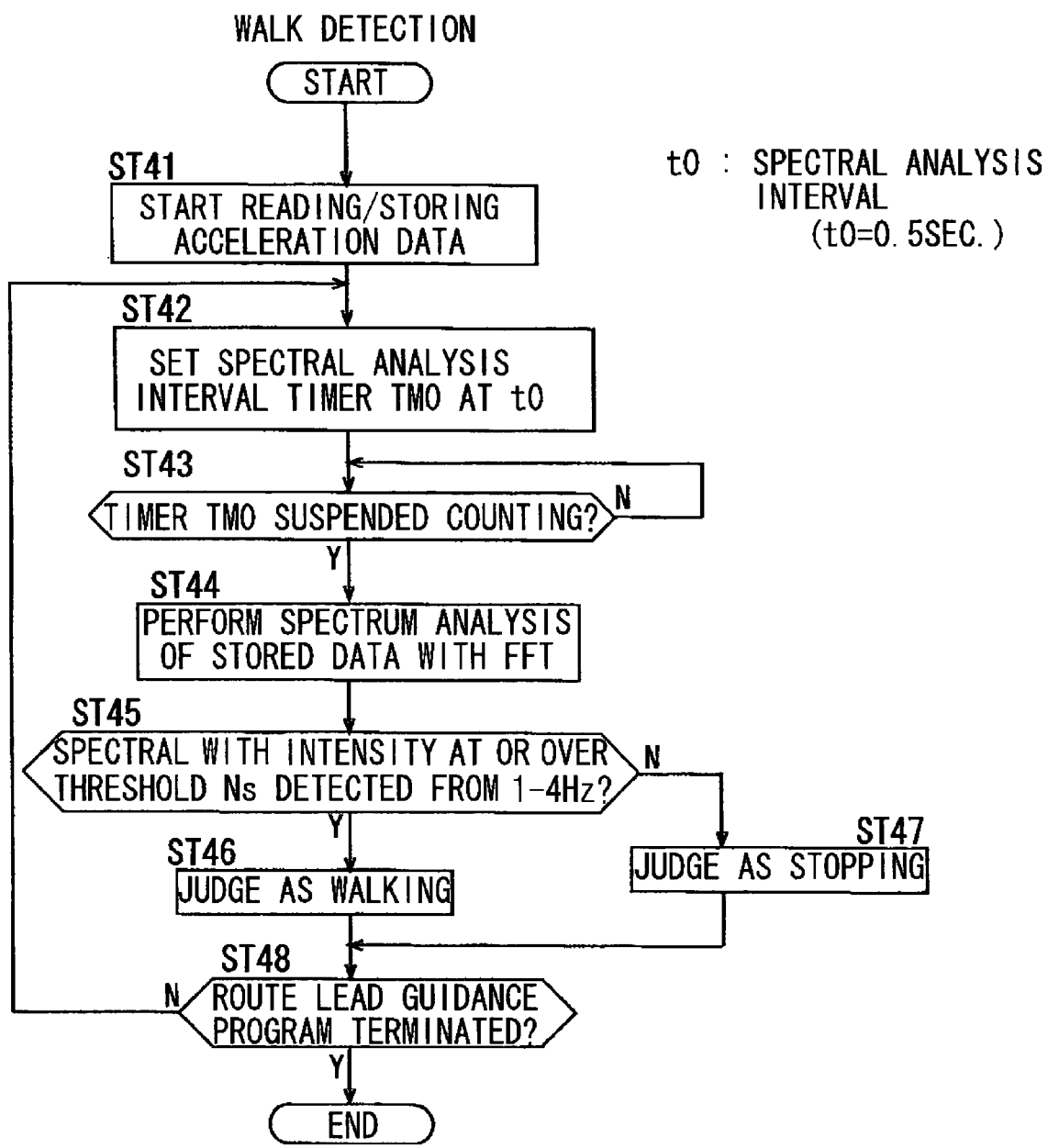
FIG. 10 is a flowchart of the walk detecting process provided by the mobile telephone in the portable navigation system of the first embodiment.
Figure 11:
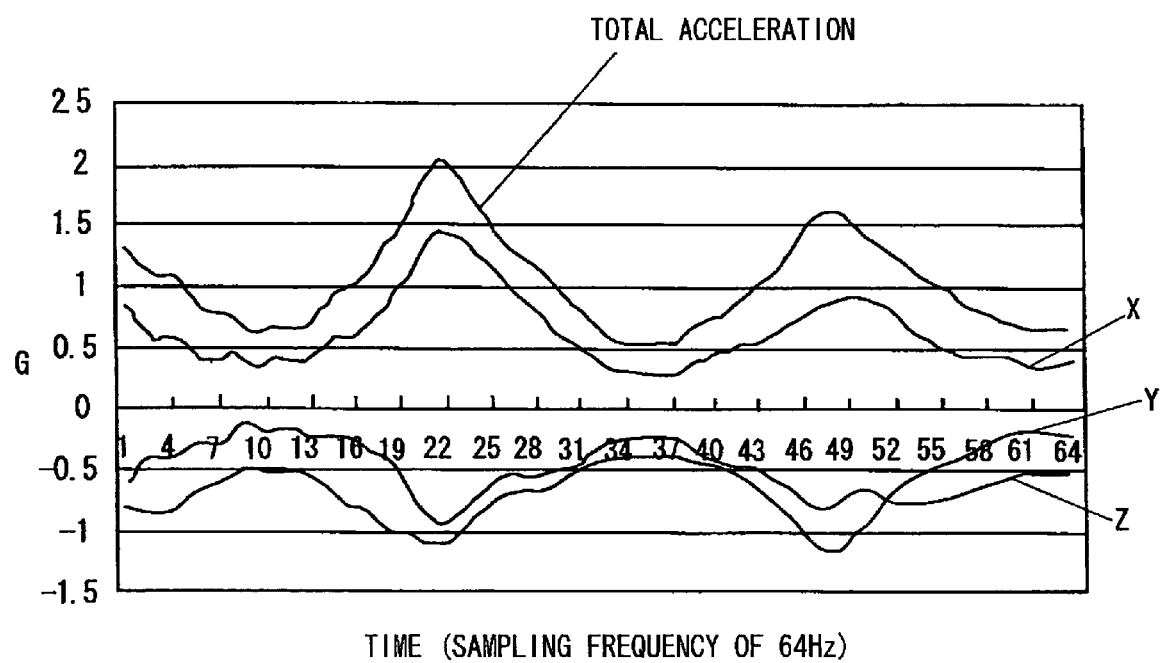
FIG. 11 is a graph of one example of the acceleration data measured on the mobile telephone while the user is walking carrying the portable terminal of the first embodiment, with the acceleration on the vertical axis and the time on the horizontal axis.
Figure 12:
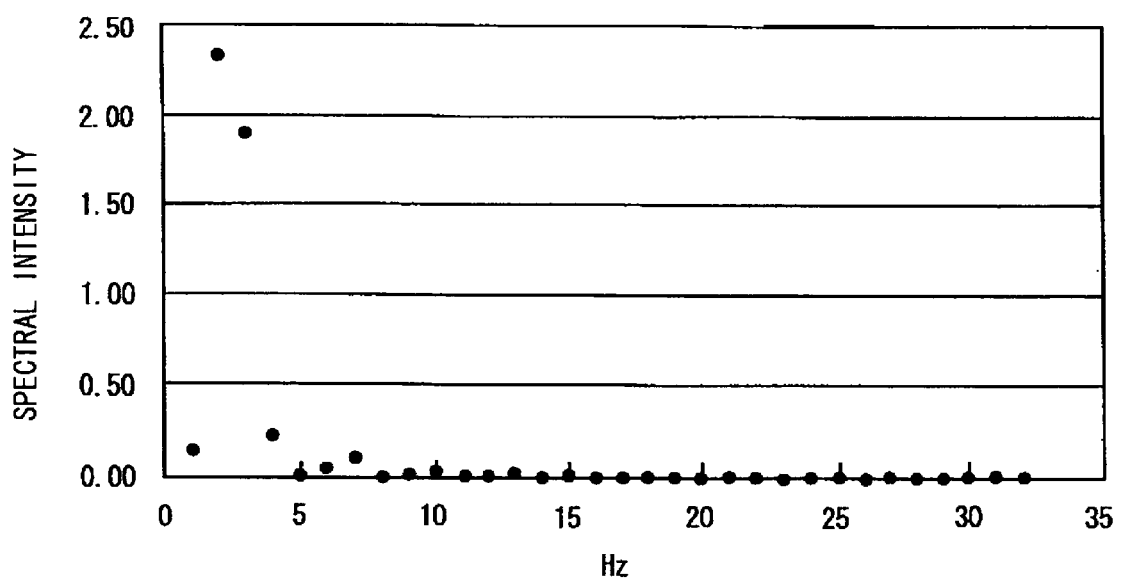
FIG. 12 is a graph of the spectral analysis result of the acceleration data in FIG. 11, with the spectral intensity on the vertical axis and the spectral value on the horizontal axis.

1: Route lead guidance device
11: Display screen
22: Route image
23: Lead image
23a: Updated lead image
23b: Stopped lead image
24: Route guidance image
29: Lead position update instruction image
29a: Stop update instruction image
29b: Updating instruction image
KC1: Liquid crystal driving circuit control means
KC4: Walk detecting means
KC4C: Spectral analysis means
KC15B: Route guidance data storage means
KC16C: Lead position update means
KC16C1: Lead position moving distance calculating means
KC17C: Guidance point arrival judging means
KC18: Route guidance image creating means
KC18A: Toggle key image setting means
KC18B: Lead image setting means
S: Route lead guidance system
SN1: Acceleration sensor

The invention claimed is:

1. A route lead guidance system, comprising:
a display screen to display a route guidance image;
an acceleration detecting device to detect acceleration;
a route storage memory to store a route from a starting point to a destination, and to store a guidance point located on the route at which guidance is provided to the user; and
a controller, the controller comprising
a route guidance image creator to create the route guidance image including a route image specifying the route, and to create a lead image showing a lead position on the route ahead of a user's current position to lead the route;
a walk detector to detect the user's walking based on the acceleration detected by the acceleration detecting device;
a lead position updater to update the lead position in accordance with the user's walking as the user's walking is detected by the walk detector, wherein the lead position updater includes a lead position calculator that calculates a moving distance of the lead position based on a predetermined time period during which walking is detected by the walk detector and a preset moving speed of the lead position, and the lead position updater updates the lead position based on the calculated moving distance of the lead position;
a guidance point judger to judge whether the lead position arrives at the guidance point on the route; and
wherein the lead position updater suspends updating of the lead position as the lead position arrives at the guidance point.

2. The route lead guidance system according to claim 1, wherein the controller further comprises:
a lead image setter to set an updated lead image that specifies that the lead position is being updated as the lead image when the lead position is being updated and sets a suspended lead image that specifies that updating of the lead position is suspended as the lead image when updating of the lead position is suspended.

3. The route lead guidance system according to claim 1 or 2,
wherein the route guidance image created by the route guidance image creator includes a lead position update instruction image that enables the user to instruct executing and suspending updating of the lead position; and
the lead position updater executes and suspends updating of the lead position in accordance with an entry to the lead position update instruction image.

4. The route lead guidance system according to claim 3, further comprising:
an update instruction image setter to set an update suspension instruction image that instructs suspension of updating of the lead position as the lead position update instruction image when the lead position is being updated and sets an update instruction image that instructs execution of updating of the lead position as the lead position update instruction image when updating of the lead position is suspended.

5. A portable route lead guidance device, comprising:
a display screen to display a route guidance image;
an acceleration detecting device to detect acceleration;
a route storage memory to store a route from a starting point to a destination, and to store a guidance point located on the route at which guidance is provided to the user; and
a controller, the controller comprising:
a route guidance image creator to create a route guidance image including a route image specifying the route, and to create a lead image showing a lead position on the route ahead of a user's current position to lead the route;
a walk detector to detect the user's walking based on the acceleration detected by the acceleration detecting device;
a lead position updater to update the lead position in accordance with the user's walking as the user's walking is detected by the walk detector, wherein the lead position updater includes a lead position calculator that calculates a moving distance of the lead position based on a predetermined time period during which walking is detected by the walk detector and a preset moving speed of the lead position, and the lead position updater updates the lead position based on the calculated moving distance of the lead position;
a guidance point arrival judger to judge whether the lead position arrives at the guidance point on the route; and
wherein the lead position updater suspends updating of the lead position as the lead position arrives at the guidance point.

* * * * *